United States Patent
Burkart et al.

(10) Patent No.: US 7,543,313 B2
(45) Date of Patent: Jun. 2, 2009

(54) DEVICE FOR READING FROM OR WRITING TO OPTICAL RECORDING MEDIA

(75) Inventors: Harald Burkart, Villingen-Schwenningen (DE); Rolf Dupper, Villingen-Schwenningen (DE); Tsuneo Suzuki, Mönchweiler (DE)

(73) Assignee: Thomson Licensing, Boulogne Billancourt (FR)

( * ) Notice: Subject to any disclaimer, the term of this patent is extended or adjusted under 35 U.S.C. 154(b) by 799 days.

(21) Appl. No.: 11/107,764

(22) Filed: Apr. 15, 2005

(65) Prior Publication Data

US 2005/0231778 A1 Oct. 20, 2005

(30) Foreign Application Priority Data

Apr. 15, 2004 (EP) .................... 04008969

(51) Int. Cl.
*G02B 26/08* (2006.01)
(52) U.S. Cl. ..................................... 720/687
(58) Field of Classification Search ........... None
See application file for complete search history.

(56) References Cited

U.S. PATENT DOCUMENTS

| 6,341,104 | B1 | 1/2002 | Yamaguchi et al. |
| 6,704,255 | B2* | 3/2004 | Tanaka .................. 369/44.14 |
| 2001/0008505 | A1 | 7/2001 | Wade et al. |
| 2003/0193854 | A1* | 10/2003 | Lee et al. ............ 369/44.16 |
| 2004/0052169 | A1* | 3/2004 | Tanaka ................. 369/44.14 |

FOREIGN PATENT DOCUMENTS

| EP | 1 089 268 | 9/2000 |
| JP | 2002/237,066 | 8/2002 |
| JP | 2003/130,107 | 5/2003 |
| WO | WO 03/052485 | 6/2003 |

* cited by examiner

*Primary Examiner*—Mark Blouin
(74) *Attorney, Agent, or Firm*—Robert D. Shedd; Harvey D. Fried; Patricia Verlangieri

(57) ABSTRACT

A device for reading from or writing to optical recording media, having an optical scanner for generating a scanning beam and for detecting a detection beam influenced by the optical recording medium, and a lens holder for focusing the scanning beam onto the optical recording medium; the lens holder being mechanically and electrically coupled to the scanner by retaining wires is disclosed. In a device according to the invention at least one of the retaining wires is a multi-strand wire.

13 Claims, 1 Drawing Sheet

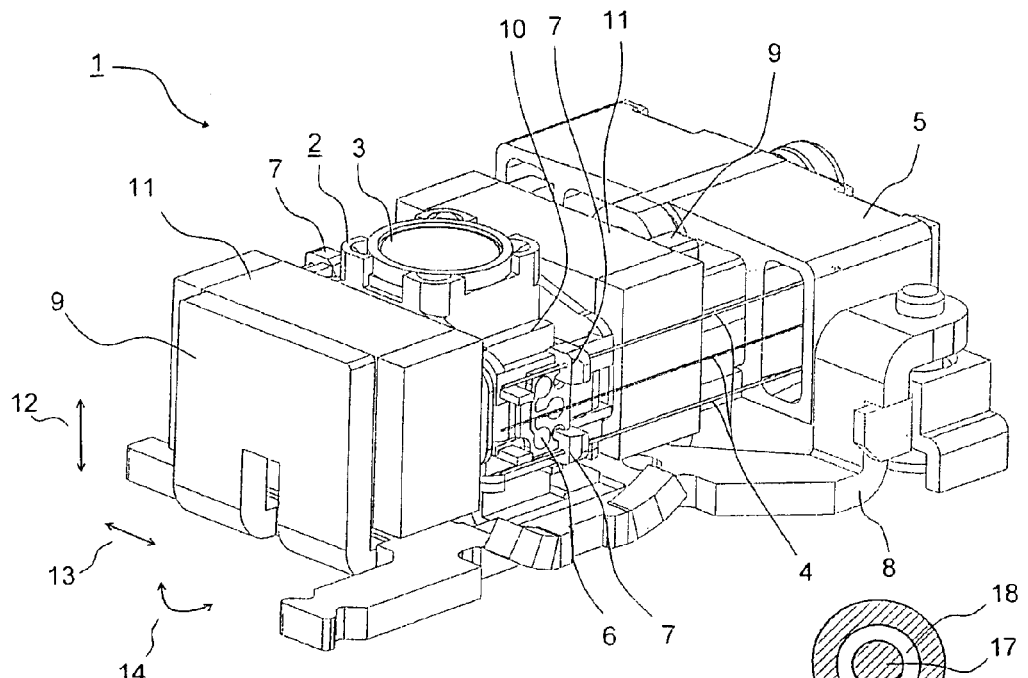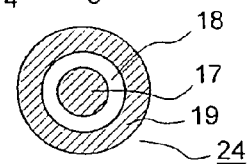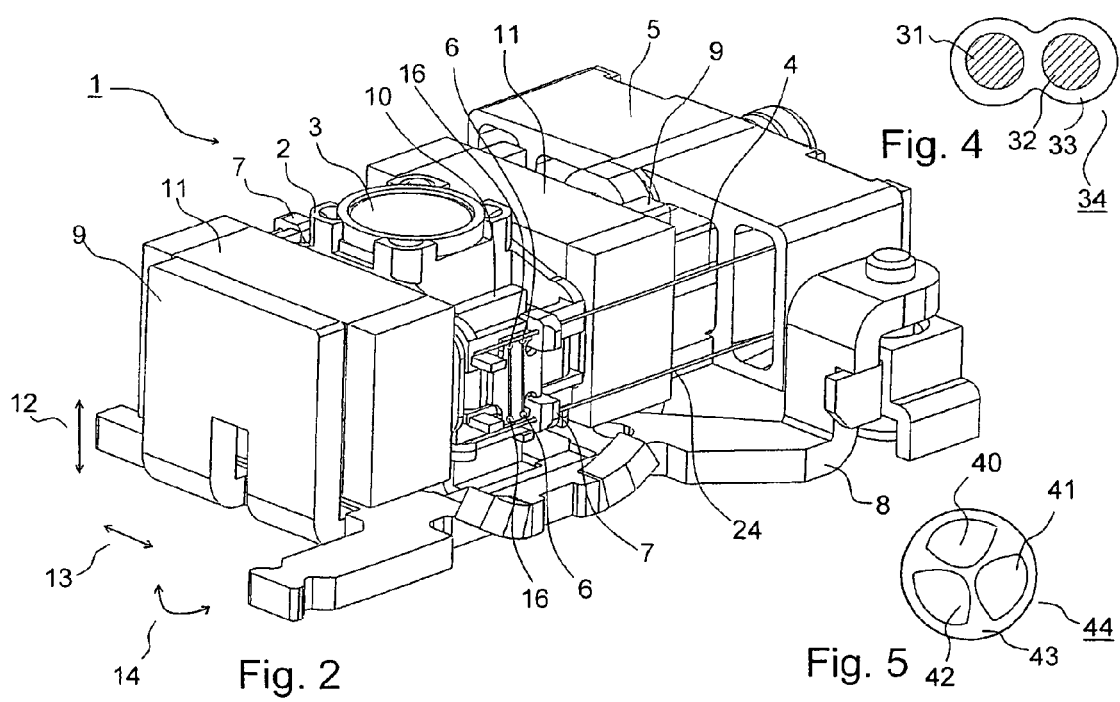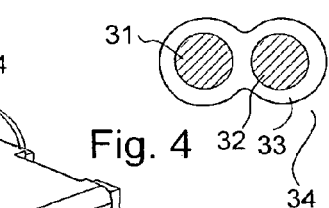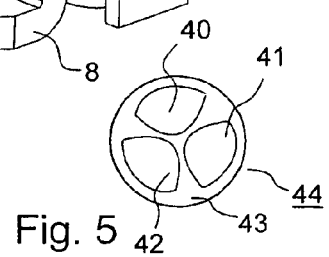

DEVICE FOR READING FROM OR WRITING TO OPTICAL RECORDING MEDIA

FIELD OF THE INVENTION

The present invention relates to a device for reading from or writing to optical recording media, which has an optical scanner for generating a scanning beam and for detecting a detection beam influenced by the optical recording medium, and a lens holder for focusing the scanning beam onto the optical recording medium, the lens holder being mechanically and electrically coupled to the scanner by retaining wires.

BACKGROUND OF THE INVENTION

The mechanical coupling of such device permits the lens holder to be held movably on the scanner, while the electrical coupling serves for feeding electric current to actuator coils which are arranged on the lens holder and are used for focus regulation, tracking control etc. Consideration is given to CD, DVD or else other optical recording media, for example, as optical recording media.

SUMMARY OF THE INVENTION

According to the invention, it is provided to construct at least one of the retaining wires as a multistrand wire. Two or three or else an even higher number of electric conductors are united in this case in the multistrand wire. This has the advantage that the mechanical behaviour of the multistrand wire approximates or is even equal to that of an individual wire, while it is rendered possible at the same time to transmit a number of electrical signals independently of one another between lens holder and scanner. A four-wire arrangement has proved to be very favorable for the mechanical coupling of the lens holder to a scanner. In specific situations, however, it is desirable or necessary to transmit a higher number of electric signals, for example when a sensor is arranged on the lens holder, or when more than two independent actuators are arranged on the lens holder. As a result of the solution according to the invention, an increased number of electric connections are rendered possible without parting from the mechanical four-wire coupling.

The multi-strand wire is advantageously a coaxial wire. This has the advantage that the mechanical properties of a coaxial wire are particularly close to those of an individual wire, and so it can be used in conventional scanners without extensive mechanical adaptations.

It is provided according to the invention that the coaxial wire consists of a core which is surrounded by an insulation layer to which a metal layer is applied in turn. In the case of a three-strand wire, a further insulation layer and a metal layer applied thereon are correspondingly provided. There is a corresponding multiple for corresponding multiple conductors. In particular, when the metal layer is vapor deposited onto the insulating layer or is deposited in some other way, for example in an immersion bath, it is relatively favorable to produce it. Owing to the small additional layer thickness, the mechanical property of the core is scarcely altered. Depending on what is required for signal transmission, even a small effective cross section suffices in this case for the metal layer.

In order to make contact with the coaxial wire having a core layer and metal layer, it is provided to use a solder with a melting point which is lower than the maximum permissible temperature of the insulation layer in order to make contact with the metal layer, while a solder with a correspondingly higher melting point is provided for making contact with the core. In the case of a number of plies of metal layers, provision is correspondingly made of a number of different melting points. This has the advantage that there is no longer any need to strip the coaxial wire, it being the case, instead, that the soldering temperature alone effects the stripping, or that the insulation layer is retained when contact is made with the metal layer. Furthermore, there is no need for an already stripped multistrand wire to be positioned exactly in mechanical terms in relation to the contact points, since the compulsory stripping takes place directly at the soldering points. It is likewise within the scope of the invention to undertake the stripping by heating above the maximum permissible temperature of the insulating layer, even when both soldered connections are performed at the same temperature. A further alternative consists in sharpening the multistrand wire at the front end in the shape of a cone in a way similar to sharpening a pencil, and stripping at a suitable angle in the process.

As an alternative to this, it is provided that the multistrand wire consists of a number of individual wires twisted or arranged in parallel. It is possible in this case for one or more of the individual wires themselves to be provided as a coaxial wire. In addition to twisting or parallel arrangement, there are also other suitable geometrical arrangements in the scope of the invention, for example wrapping a stretched coil wire around with one or more further individual wires. One advantage of constructing the multiconductor wire from a number of individual wires consists in its cost-effective production, since, for example, twisting individual wires is a method applied on a large scale. Again, the arrangement of parallel individual wires can be more cost effective in the production process than other proposed solutions. In particular, when three or more wires are twisted or else arranged in parallel, the result is a cross section which is roughly approximate to that of an individual wire. The mechanical properties are therefore relatively similar to those of an individual wire.

It is provided according to the invention that the individual wires consist of different materials, for example one individual wire consisting of copper and the other of aluminium, or different copper alloys being provided for different individual wires. Again, it is within the scope of the invention to use identical materials for the metal core but to have different insulating outer layers. Different flexural strengths of different materials for the individual wires are frequently desired in order to give rise to a so-called passive tilt effect, that is to say the tilting of the lens holder because of focusing or tracking movements without a special tilt tracking signal. It is thereby possible, for example, to achieve coarse tracking for the tilt in the case of which only fine tracking via special tilt actuators is required. The different colored appearance of different materials has the further advantage of simplifying the identification of the correct wire, or component wire, with which contact is to be made or which is to be used during mounting.

In the case of a four-wire suspension, it is provided to arrange the individual wires on the side of the lens holder facing the optical recording medium, and to arrange multistrand wires on the correspondingly averted side. This has the advantage of a greater stability and of a desired passive tilt effect.

A multiple wire is advantageously assigned both lines of a coil arranged on the lens holder. This has the advantage, inter alia, that magnetic fields produced by the current flow cancel one another out, and thereby reduce possible disturbing effects.

Further advantages of the invention are specified in the following description of exemplary embodiments.

BRIEF DESCRIPTION OF THE DRAWINGS

FIG. 1 shows a known device,
FIG. 2 shows a device according to the invention,
FIG. 3 shows a cross section through a first multiconductor wire according to the invention,
FIG. 4 shows a cross section through a second multiconductor wire according to the invention, and
FIG. 5 shows a cross section through a third multiconductor wire according to the invention.

DETAILED DESCRIPTION OF PREFERED EMBODIMENTS

FIG. 1 shows a part of an optical scanner 1 of a known device. In evidence are the lens holder 2, a focusing lens 3 arranged therein, and retaining wires 4 by means of which the lens holder 2 is mechanically and electrically coupled to a holder 5. The electrical coupling is served by contacting points 6 on the lens holder 2, while mechanical connectors 7 are provided for the mechanical coupling. It is to be seen that two mechanical connectors 7 are arranged on the side of the lens holder 2 facing the viewer, and two further connectors 7, of which one is not visible, are provided on the side averted from the viewer, the result being to implement a mechanical four-wire suspension of the lens holder 2. The middle retaining wire 4 serves essentially for making electrical contact and makes only a slight contribution to the mechanical suspension. In the exemplary embodiment illustrated, the retaining wires 4 are not yet electrically connected to the contacting points 6, so as to render the details more readily visible.

The holder 5 is connected to a metal base element 8 which forms links 9, 10 for forming a magnetic return path with permanent magnets 11. The field lines located in the interspace between the permanent magnet 11 and link 10 lie inside solenoids (not visible here) which serve as actuators for setting the focus in the direction of the double arrow 12, the tracking in the direction of the double arrow 13, or of the tilt compensation in accordance with the curved double arrow 14.

FIG. 2 shows a device according to the invention. Identical parts are provided with identical reference numerals as with reference to FIG. 1, and are therefore not necessarily described here again. It is to be seen that in this exemplary embodiment only two retaining wires 4, 24 are arranged, the upper retaining wire 4 being an individual wire, and the lower one being a coaxial wire 24. Illustrated in relation to each wire are two contacting points 6, 16, the contacting point 6 situated closer to the holder 5 being provided with a solder of lower melting point than the other contacting point 16. In the case of the individual wire 4, only one of the two contacting points 6 or 16 is used, while in the case of a coaxial wire 24 the contacting point 6 serves for making contact with the outer metal layer, while the contacting point 16 with a higher melting point serves for making contact with the core of the coaxial wire 24. The insulation layer melts away when contact is made. It is to be ensured that the insulation layer breaks off until a short circuit between the two conductors is prevented. This can be achieved with suitable materials.

FIG. 3 shows a cross section through a first inventive multiple-ply wire formed as a coaxial wire 24. It has a metal core 17 which is surrounded by an insulation layer 18 to which an outer metal layer 19 is applied. In the example illustrated, the outer metal layer 19 has a substantially greater cross section than the core 17, and thereby determines the essential mechanical properties of the coaxial wire 24. As an alternative to this, there is a possibility of constructing the core 17 in a fashion relatively larger than the metal layer 19, in order to cause the mechanical properties of the coaxial wire 24 to be determined essentially by the core 17. Suitable variations are within the scope of the invention.

FIG. 4 shows a cross section through a second inventive multiconductor wire 34, which consists of two individual wires 31, 32 which are connected to one another by means of an insulating sheath 33. As an alternative to this, two individual wires 31 or 32 can have a separate insulation layer and be connected to one another by a further material layer or, as an alternative to this, be connected to one another by mechanical twisting. Other cross sections than the circular cross section indicated here for the two individual wires 31, 32 are also within the scope of the invention.

FIG. 5 shows a cross section through a third inventive multiconductor wire 44. The multiconductor wire 44 consists of three individual wires 40, 41, 42, whose cross section is fashioned such that the sheath 43 connecting them has a virtually circular outer boundary. The mechanical properties of such a multiconductor wire 44 very closely approach those of an individual wire with a circular cross section. Both the multiconductor wire 34 of FIG. 4 and the multiconductor wire 44 of FIG. 5 can have both individual wires 31, 32 or 40, 41, 42, respectively arranged in parallel, and corresponding twisted wires.

What is claimed is:

1. Device for reading from or writing to optical recording media, having an optical scanner for generating a scanning beam and for detecting a detection beam influenced by the optical recording medium, and a lens holder for focusing the scanning beam onto the optical recording medium, the lens holder being mechanically and electrically coupled to the scanner by retaining wires, wherein at least one of the retaining wires being a coaxial multistrand wire that consists of a core, an insulation layer surrounding the latter, and a metal layer applied to the said insulation layer, wherein a first solder is provided for the purpose of making contact with the outer metal layer, the first solder having a melting point which is lower than the maximum permissible temperature of the insulation layer, and a second solder is provided for making contact with the core, the second solder having a correspondingly higher melting point.

2. Device according to claim 1, wherein the multistrand wire includes of a number of individual wires twisted or arranged in parallel.

3. Device according to claim 2, wherein the individual wires are formed of different materials.

4. Device according to claim 1, wherein the multistrand wire includes of a number of individual wires twisted or arranged in parallel.

5. Device according to claim 4, wherein the individual wires are formed of different materials.

6. Device according to claim 1, wherein in the case of a four-wire suspension, individual wires are arranged on the side of the lens holder facing the optical recording medium, and multistrand wires are arranged on an averted side.

7. Device according to claim 1, wherein a multiple wire is assigned both electric lines of a coil of the lens holder.

8. Device for reading from or writing to optical recording media, having an optical scanner for generating a scanning beam and for detecting a detection beam influenced by the optical recording medium, and a lens holder for focusing the scanning beam onto the optical recording medium, the lens holder being mechanically and electrically coupled to the scanner by retaining wires, wherein at least one of the retaining wires being a coaxial multistrand wire that consists of a core, an insulation layer surrounding the latter, and a metal layer applied to the said insulation layer, wherein a first solder is provided for the purpose of making contact with the outer metal layer, the first solder having a melting point which is lower than the maximum permissible temperature of the insulation layer, and a second solder is provided for making contact with the core, the second solder having a correspondingly higher melting point, the suspension being a four-wire suspension, and individual wires are arranged on the side of the lens holder facing the optical recording medium, and multistrand wires are arranged on an averted side.

9. Device according to claim 8, wherein the multistrand wire includes a number of individual wires twisted or arranged in parallel.

10. Device according to claim 8, wherein the individual wires are formed of different materials.

11. Device according to claim 8, wherein the multistrand wire includes a number of individual wires twisted or arranged in parallel.

12. Device according to claim 11, wherein the individual wires are formed of different materials.

13. Device according to claim 8, wherein a multiple wire is assigned both electric lines of a coil of the lens holder.

* * * * *